United States Patent [19]

Venås

[11] Patent Number: 4,618,427
[45] Date of Patent: Oct. 21, 1986

[54] METHOD OF TREATING AND BREAKING UP A LIQUID WITH THE HELP OF CENTRIPETAL FORCE

[75] Inventor: Karl Venås, Saupstad, Norway

[73] Assignee: Ardal og Sundal Verk a.s., Norway

[21] Appl. No.: 694,116

[22] Filed: Jan. 23, 1985

[30] Foreign Application Priority Data

Jan. 25, 1984 [NO] Norway .................................. 840272

[51] Int. Cl.$^4$ ........................... C02F 3/02; C21C 7/00
[52] U.S. Cl. ..................................... 210/629; 75/51.1; 75/61; 75/68 R; 75/93 E; 75/0.5 C; 210/738; 210/758; 261/87; 261/93; 420/580; 420/590; 420/18
[58] Field of Search .............. 75/61, 93 R, 51.1, 68 R, 75/93 E, 130 B; 210/721, 738, 628, 208, 219, 758, 620, 629, 787; 261/87, 93; 420/580, 590

[56] References Cited

U.S. PATENT DOCUMENTS

| | | | |
|---|---|---|---|
| 3,278,295 | 10/1966 | Ostberg et al. | 75/61 |
| 3,554,518 | 1/1971 | Ostberg | 75/61 |
| 3,573,895 | 4/1971 | Ostberg | 75/61 |
| 3,743,263 | 7/1973 | Szekely | 75/68 X |
| 3,753,689 | 8/1973 | Ramacciotti | 75/61 |
| 3,796,417 | 3/1974 | Kaelin | 210/219 |
| 3,915,694 | 10/1975 | Ando | 75/61 |
| 3,972,709 | 8/1976 | Chia et al. | 75/61 |
| 3,972,815 | 8/1976 | O'Cheskey et al. | 261/93 |
| 4,341,641 | 7/1982 | Novak | 261/93 |
| 4,392,888 | 7/1983 | Eckert | 75/93 E |

FOREIGN PATENT DOCUMENTS

| | | |
|---|---|---|
| 190479 | 4/1965 | Fed. Rep. of Germany . |
| 1285098 | 12/1968 | Fed. Rep. of Germany . |
| 2019350 | 2/1971 | Fed. Rep. of Germany . |
| 2127563 | 12/1972 | Fed. Rep. of Germany . |
| 2414703 | 6/1975 | Fed. Rep. of Germany . |
| 2607963 | 9/1977 | Fed. Rep. of Germany . |
| 60764 | 4/1970 | Luxembourg . |
| 24835 | 6/1914 | Norway . |
| 1335531 | 11/1969 | Norway . |
| 134754 | 12/1972 | Norway . |
| 137601 | 12/1972 | Norway . |
| 822913 | 8/1982 | Norway . |
| 444123 | 2/1968 | Switzerland ........................ 210/219 |

Primary Examiner—Peter Hruskoci
Attorney, Agent, or Firm—Wenderoth, Lind & Ponack

[57] ABSTRACT

A hollow body, a rotor, with holes in the bottom and the side wall, is immersed down into a liquid and rotated with the help of a shaft suspended over the liquid.

The liquid, which enters the rotor through the hole in the bottom, will, on account of the centripetal force, acquire a surface in the shape of a paraboloid of revolution. The centripetal force will throw the liquid out through the holes in the side wall, while new liquid will continuously enter through the bottom of the rotor.

The shaft for the rotor can be hollow, and through this gas, solid or liquid materials can be added to the liquid.

The invention makes possible the treatment in various ways of different types of liquid, from aqueous suspensions to molten metal.

18 Claims, 9 Drawing Figures

METHOD OF TREATING AND BREAKING UP A LIQUID WITH THE HELP OF CENTRIPETAL FORCE

BACKGROUND AND SUMMARY OF THE INVENTION

This invention relates to a method of treating and breaking up ("globulating") a liquid with the help of centripetal force, and also apparatus for performing the method.

In this context, the term "liquid" refers to solutions and suspensions in water, organic liquids and molten metal.

A large number of procedures are known for treating and breaking up liquids, in which the treatment can consist of various ways of introducing substances into a liquid, and stirring this in order to make the liquid as homogeneous as possible. The term "treatment" in this context also refers to the removal of substances from a liquid, for example a gas, by airing the liquid. Airing is particularly efficient when the liquid is broken up into small drops and thrown out in a vacuum or in a controlled atmosphere. Treatment can also involve the transfer of solid compound in a volatile reaction, for example, by treating the liquid with chlorine to remove contaminants in the form of chlorides.

This present invention was made in connection with the refining of molten metal, with particular reference to the treatment of molten aluminium. In this connection, the operation usually involves the removal of hydrogen and/or solid particles. It can also often be necessary to reduce the content of unwanted alloying metals, such as magnesium and iron.

Patents have been sought for a number of procedures for refining aluminium.

In Norwegian patent application No. 82 2913, Pechiney have made an extensive analysis of the problems in question and have, as a result of their work, invented a rotating gas-dispersing device which consists of a cylindrical rotor equipped with blades immersed in the metal, and connected to a hollow drive shaft through which the gas can be introduced. The rotor is perforated with paired channels, one of the channels in each pair being for molten metal, and the other for gas.

This apparatus stirs the surface of the metal which is to be treated, and is costly to make and operate. The channels become corroded, and the gas is not used efficiently. Th equipment does not operate satisfactorily.

In their Norwegian provisional patent (utlegningsskrift) No. 137 601, Union Carbide have approached the problem from a different angle. Pre-heated inert gas is introduced into an enclosed refining vessel through a rotating gas injector. According to Union Carbide's Norwegian provisional patent (utlegningsskrift) No. 134,754, this consists of a vertical shaft, with a drive arrangement at its upper end, and at the lower end fixed to a winged rotor. The shaft rotates in a stationary sheath, the lower end of which is equipped with wings and vertical channels between the wings, whereby by rotating the rotor, gas is injected into the molten metal.

This method produces a lively circulation of the gas in the metal and operates efficiently. However, the system is awkward. It is difficult to empty the apparatus, and the rotor may break if solid particles enter the system.

An object of the present invention is to avoid all forms of narrow channels in an apparatus for treating molten metal and other liquids.

The invention refers to a procedure for treating and breaking up a liquid by means of centripetal force. This is achieved in that the liquid is introduced continuously through the bottom of a rotating hollow body immersed in the liquid, and in that the rotating liquid is forced out through holes in the side wall of the hollow body, and the treatment takes place while the metal is rotating.

U.S. Pat. No. 3,753,689 discloses a method of treating a nonhomogeneous melt with a gas. The metal is placed in a container, a ladle, in a reactor. The reactor can rotate rapidly about its vertical axis, and the surface of the metal thus aquires the shape of a paraboloid of revolution, with a significantly larger surface than it had when the ladle was stationary. A suitable gas is introduced down into the ladle, and the metal is thus treated with the gas.

The melt, according to this invention, acquires an enlarged surface for the gas treatment, but it is still only a question of surface treatment.

Norwegian Pat. No. 24 835 describes the introduction of a rotating conical body down into the liquid. On account of the rotation, the liquid rotates, and the centripetal force causes the metal inside the body to rise up along the walls and be thrown out over the edge, falling like fine rain onto the surrounding liquid.

This Norwegian patent claims that the invention provides an efficient way of cleaning, scrubbing, drying and absorbing a gas. The opposite process, i.e. treating a liquid with a gas is, on the other hand, the purpose of the present invention.

Norwegian provisional patent (utlegningsskrift) No. 133 531 discloses an apparatus for producing granulated metal, consisting of a rotating hollow body with a hole in the bottom and holes in the side, partly submerged in the molten metal, and with a vertical hollow drive shaft. When this hollow body is caused to rotate, the metal, on account of the centripetal force, will be forced up inside the hollow body and ejected through the holes in the side. In operation, the holes in the side wall of the body can become clogged. Small quantities of inert gas can be introduced through the hollow shaft, and in this manner the holes in the side wall are kept open. However, the gas added has no chemical function.

To perform the method of the present invention, the rotor must have a drive shaft, suspended over the parabolic surface of the liquid, which holds the rotor at a fixed or variable level with respect to the surface of the liquid during rotation, and the rotor must have one or more holes in the bottom and in the side wall. It is necessary that the holes in the side wall have a diameter of from 1 mm to 50% of the diameter of the rotor. The bottom hole, which does not have to be circular, can have a diameter of 50-100% of the diameter of the rotor.

The number of holes in the side wall and how they are placed will depend upon the operation the apparatus is required to perform. The total area of the side holes may be equal to, or greater, or less than the area of the bottom hole. In certain cases, it can be advantageous to have several bottom holes. In operation, the side holes are below the uppermost level of the parabolic liquid surface inside the rotor yet above the lowermost level of the parabolic liquid surface formed by rotation of the rotor.

Depending upon the nature of the operation, the rotor may, in action, have the holes in the side wall below the surface of the liquid, above the surface of the liquid, or both over and under the surface of the liquid outside the rotor.

The rotor shaft is preferably hollow, and can be used for adding solid, liquid or gaseous material to the liquid.

The rotor must be made of a material which can withstand the centripetal forces and the stresses imposed by the liquid. For treating molten metals, the rotor can be made in one or more of the following materials: graphite, aluminum titanate, boron nitride, alumina, metallic titanium or more conventional ceramic materials.

With expedient choice of materials for making the rotor, unalloyed and alloyed metals, such as aluminum, magnesium, iron and ferro alloys, can be treated by the method in question. Water and an aqueous suspension such as sewage can also be treated according to the invention.

BRIEF DESCRIPTION OF THE DRAWINGS

Other objects, features and advantages of the invention will be better understood from the following description in conjunction with the accompanying drawings, wherein.

DETAILED DESCRIPTION

Figure 1:
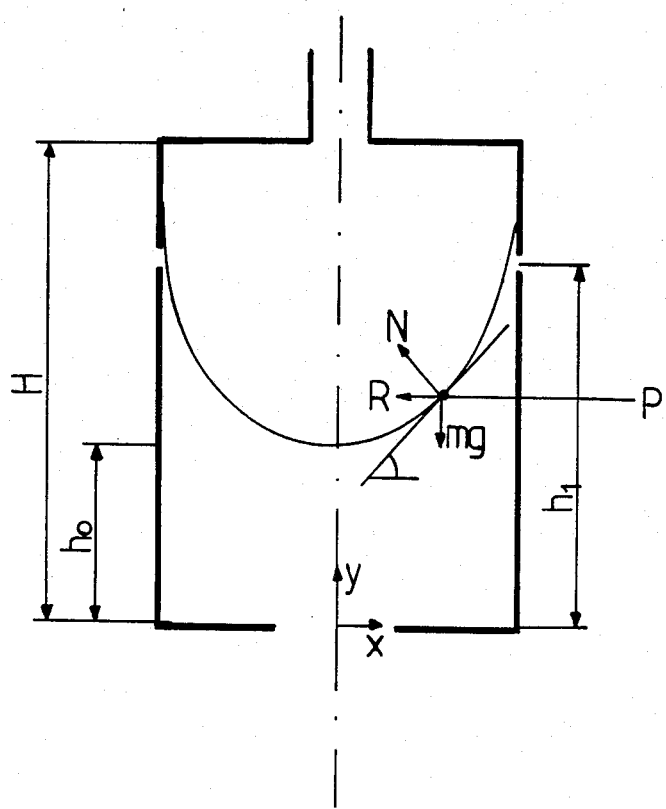
FIG. 1 is a representation of the forces acting on the surface of the liquid in a rotating rotor.

The forces acting on the liquid in a rotating rotor are shown in FIG. 1 wherein P is a point on the surface of the liquid, N is a force perpendicular to the tangent at point P, R is the centripetal force at point P, g is the acceleration due to gravity of a mass m, H is the height of the rotor, $h_o$ is the height from the bottom of the rotor to the lowest point of the liquid in the rotating rotor, $h_1$ is the height of a side hole in the rotor, x is the horizontal axis and y is the vertical axis of the rotor.

EXAMPLE 1

As an example of the method, a procedure for treating aluminium is given below, with reference to FIG. 2.

Figure 2:
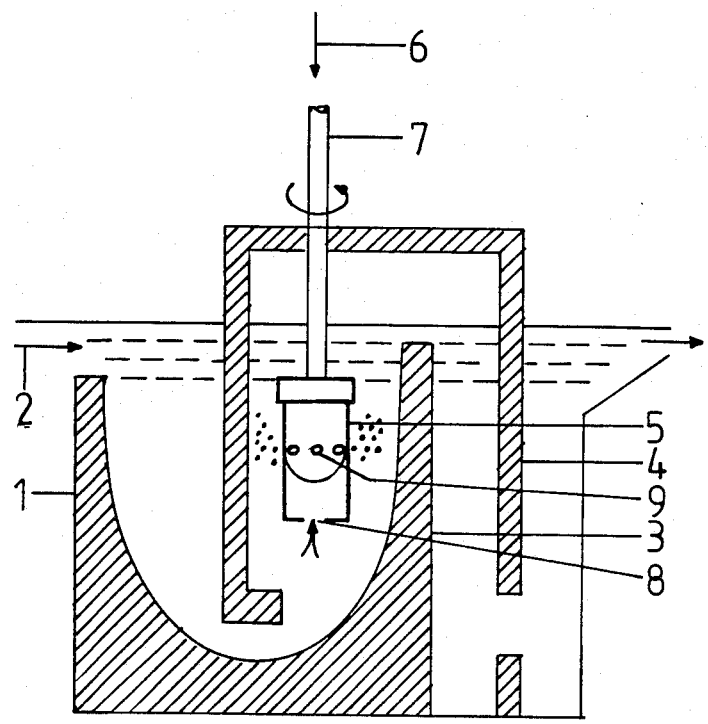
FIG. 2 shows an apparatus according to the invention for treating flowing molten aluminum wherein gas and liquid metal are mixed below the liquid metal surface.

In FIG. 2, we see the vessel 1 in which the treatment is to take place. The vessel is placed in molten metal 2 flowing in the direction of the arrows. A dividing wall 3 and a "bell" 4 forces the metal to flow past the rotor 5 to which gas 6 is added through the rotor shaft 7. Through the hole 8 in the bottom of the rotor 5, the metal rises into the inside of the rotor, and is sprayed out together with the gas through the holes 9 in the side of the rotor. In this manner, very close contact is established between the gas and the metal, first in the holes and in the side wall of the rotor, and then between the gas bubbles and the molten metal.

Several inert gases can be used together, such as argon, or nitrogen or one or more active gases, such as chlorine or freon 12. Also oxygen must be regarded as an active gas. In certain cases, it can be also be expedient to make use of a mixture of active and passive gases. The gas may also be heated to above the temperature of the liquid. The gas bubbles will then contract in the liquid, and we will thus achieve a finer distribution of the gas.

If the apparatus in FIG. 2 had been enclosed where the molten metal enters and leaves the vessel 1, treatment would have to have been batchwise. A unit could be placed under vacuum, and the gas added through the rotor under the surface of the liquid.

EXAMPLE 2

Figure 3:
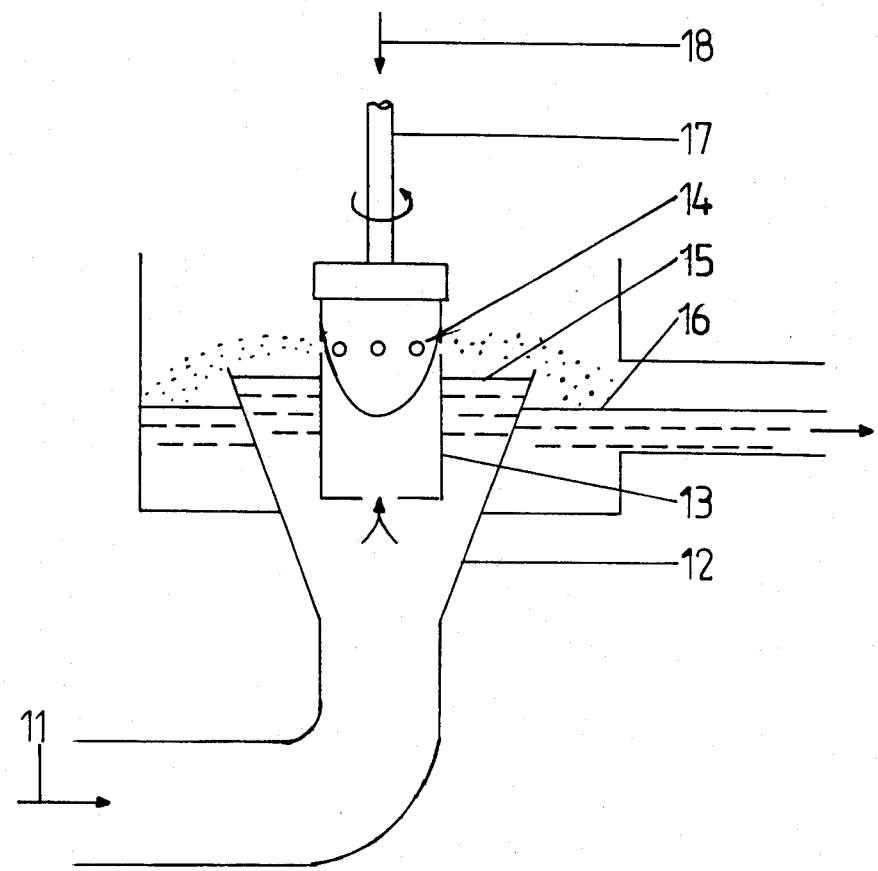
FIG. 3 shows an apparatus used to treat flowing molten metal wherein gas and molten metal are mixed and discharged above the liquid metal surface.

FIG. 3 illustrates another example of how treatment can be carried out in flowing metal. This process concerns the refining of molten metal in a casting shop trough (launder).

The molten metal 11 flows into the vessel 12, with rotor 13. This has holes 14 above the surrounding metal surface 15. Through the rotating shaft 17 for the rotor 13, gas 18 is fed into the rotor, and will react with the molten in that both gas and metal are ejected out through the holes into the surrounding metal reservoir which is emptied out of the system. The system can be enclosed (not shown here) thus protecting the molten metal against the atmosphere.

EXAMPLE 3

Figure 4:
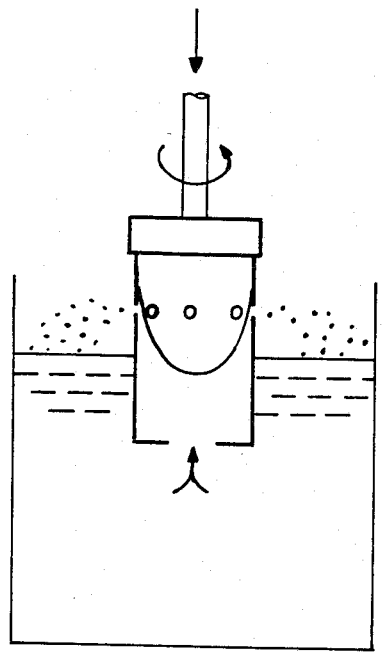
FIG. 4 shows an apparatus wherein liquid metal is sprayed over the liquid metal surface.
Figure 5:
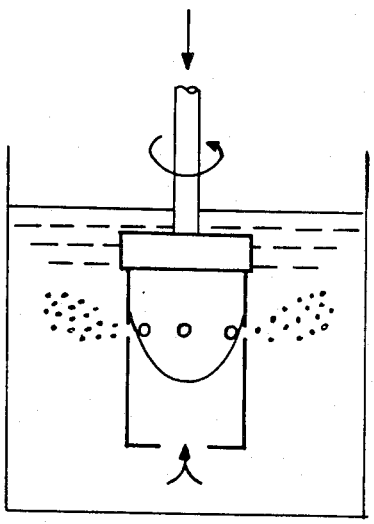
FIG. 5 shows an apparatus wherein liquid is ejected below the liquid metal surface.

The method can, with advantage, be used to treat molten metal, for example in a holding furnace, which is the case with aluminum, in a ladle or the like. In FIG. 4 we see an aplication in which the liquid (molten metal) is sprayed out over the surface of the surrounding liquid. In FIG. 5, the liquid is ejected through the side holes under the surface of the surrounding liquid. In both cases, the gas is forced out together with the liquid, ensuring close contact between these two phases.

EXAMPLE 4

Figure 6:
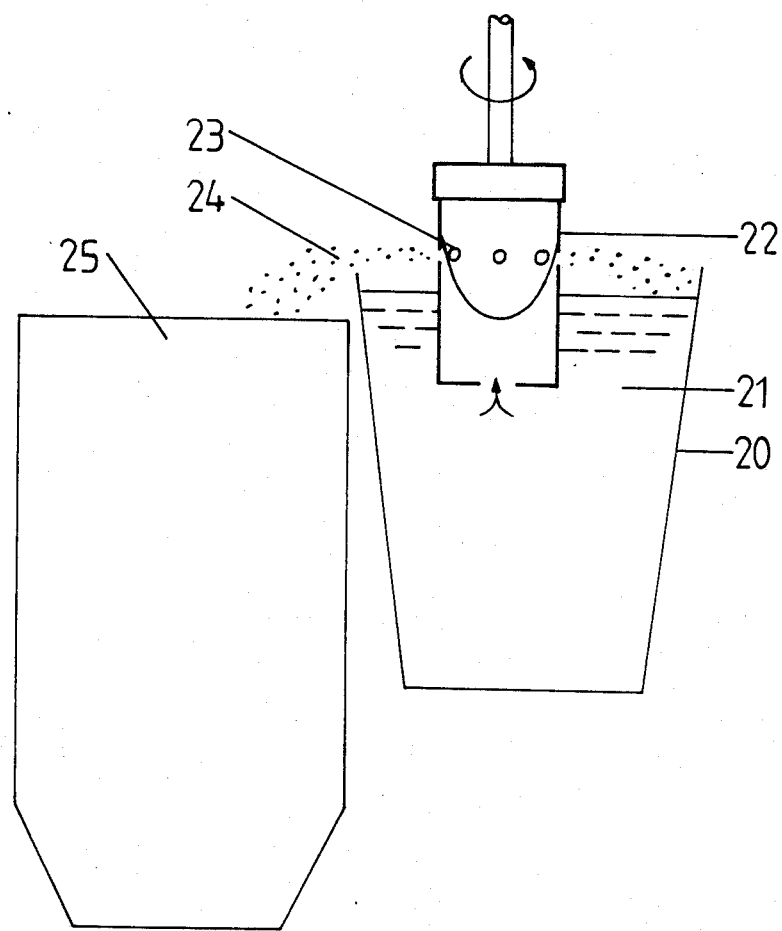
FIG. 6 shows an apparatus for producing metal granules.

When the liquid, as shown in FIG. 4, is thrown out beyond the surface of the surrounding metal, and subsequently removed, the method can also be used for producing metal granules. FIG. 6 shows how the metal in the crucible 20, with the molten metal 21, through the rotor 22 is ejected out through the holes 23 and caused to solidify in an atmosphere of air or inert gas, the granules 24 produced being collected in a hopper 25 and removed from the apparatus.

EXAMPLE 5

Figure 7:
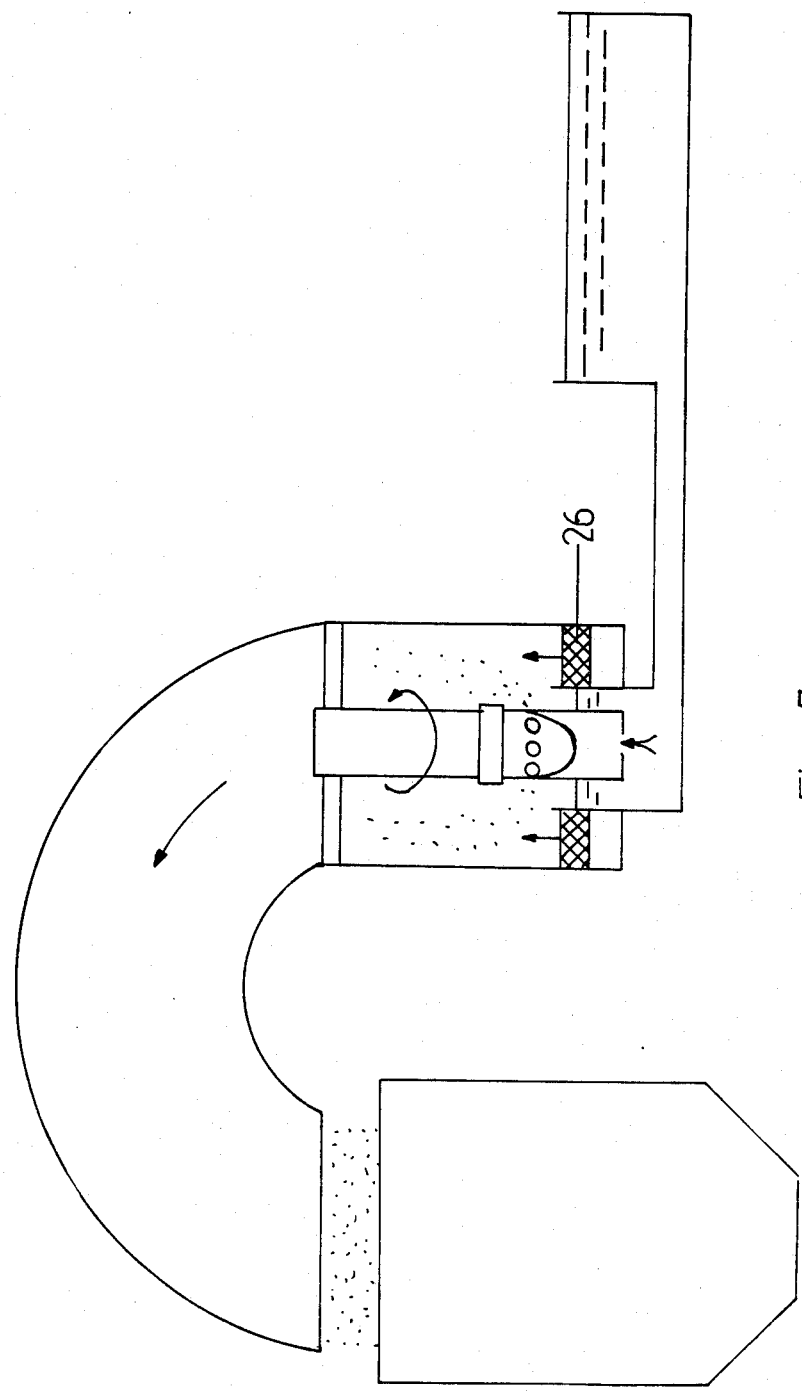
FIG. 7 shows another type of apparatus for producing metal granules.

A number of variants can be envisaged here, for example as shown in FIG. 7. Around the vessel in which the liquid (the molten metal) is treated, there is a grating 26 through which an inert gas is blown with such velocity that the granules are carried over into a collecting vessel.

EXAMPLE 6

Figure 8:
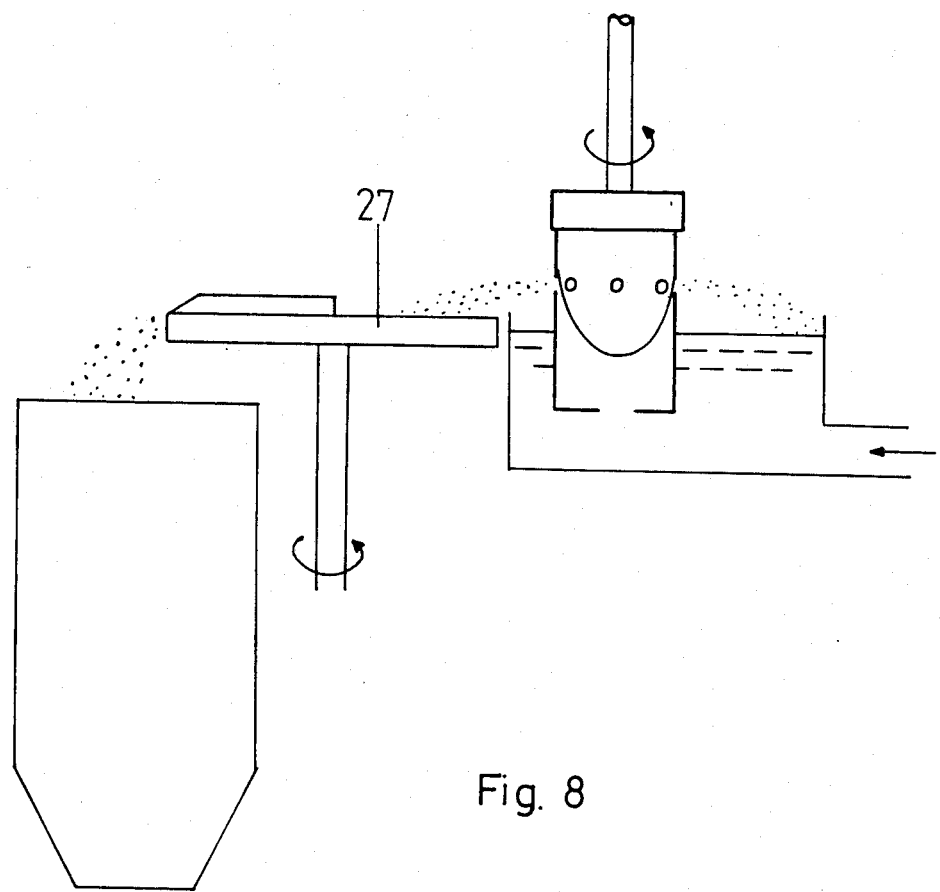
FIG. 8 shows an apparatus used to produce magnesium granules.

For special purposes, for example granulating molten magnesium, the magnesium granules can be fed onto a rotating disk 27 which is kept covered with a molten salt, see FIG. 8.

EXAMPLE 7

It was required to refine 66 kg of commercially pure aluminum in ten minutes. The rotor used had an external diameter of 80 mm and was equipped with blades on the outside from the bottom up to the side holes. Refining was performed with a gas flow of 195 liters per hour, i.e. 0.49 liters per kg of metal. The gas used was argon. The rotor revolved at 350 r.p.m. The untreated metal contained hydrogen somewhat in excess of 0.15 ppm measured with a Telegas instrument. The hydrogen concentration in the treated metal was measured in a corresponding manner, and was less than 0.06 ppm.

EXAMPLE 8

66 kg of commercially pure aluminum was refined with argon at 150 liters per hour, i.e. 0.38 liters per kg of metal. The rotor used here was smooth on the inside and the outside, and revolved at 450 r.p.m. The hydrogen content in the untreated metal was 0.29 ppm measured with a Telegas instrument. After refining for ten minutes, the hydrogen concentration was measured to be 0.09 ppm.

EXAMPLE 9

A trial was conducted to demonstrate the procedure for granulating molten metal. Tin was melted in an iron crucible, 25 cm high, and with a diameter of 18 cm. A piece had been cut away from the side of the crucible, from the top, down to 8 cm over the bottom of the crucible, in such a manner that there was an open sector of about 90° in the crucible. A cylindrical stainless steel rotor was used, 8 cm in diameter and 8 cm high. The rotor had a circular hole in the bottom, 3 cm in diameter, and a row of holes in the side wall 5 cm over the bottom of the rotor. The diameter of the holes in the side wall was 2 mm. The rotor was placed in the molten tin in such a manner that the side holes were above the surface of the surrounding metal. Under rotation, metal drops were sprayed out from the holes in the side wall of the rotor. The drops which escaped through the open sector in the side wall solidified to granules. The size of the granules is highly dependent upon the holes in the side wall. In this trial the granules had a diameter of about 2 mm. The rotor revolved at 700 r.p.m.

As may be seen from the above, the method and the rotor can be used as a continuously operating product-improving element in a production line.

The method is very suitable for, for example, desulfurizing pig iron, after adjustment, in that solid or molten magnesium is added to the pig iron melt through a tube in the rotor's shaft. The magnesium vaporizes inside the rotor, and disperses in gaseous form in the surround melt. The following reactions take place in the melt.

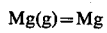

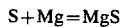

S indicates that the element is dissolved in the metal melt. The method is also suitable for desulfurizing with other desulphuring agent such as, for example, $Na_2CO_3$.

Figure 9:
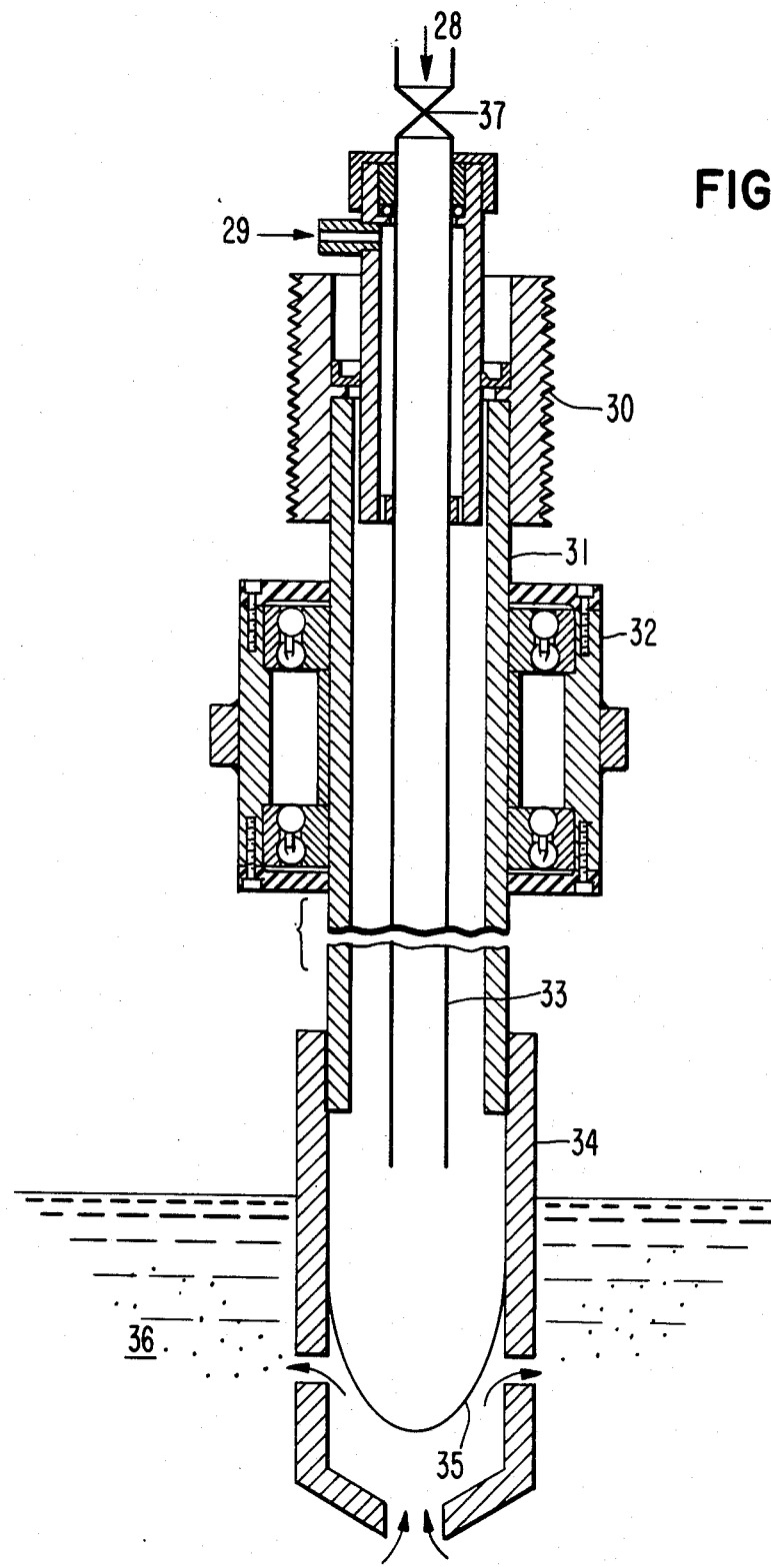
FIG. 9 shows a cross-sectional view of the rotor used according to the various methods of the invention.

FIG. 9 shows how the apparatus is assembled.

28. Input of solid or molten magnesium
29. Gas connection
30. Pulley wheel for driving rotor
31. Hollow shaft for driving rotor
32. Bearing housing
33. Water-cooled copper tube for magnesium feed
34. Rotor
35. Paraboloid of revolution
36. Pig iron melt
37. Valve The following are some examples of the desulfurizing of pig iron by adding magnesium granules with a diameter of 1–2 mm through tube 33. A small amount of argon was used as a vehicle gas to provide stable conditions. 10 grams of Mg granules were added at a time, and samples were taken after each addition. The rotor used was made of graphite and had an external diameter of 80 mm. The rotor revolved at about 600 rpm.

EXAMPLE 10

To a pig iron melt of 193 kg. 30 grams of Mg granules were added. At the beginning of the experiment, the sulphur content was 0.014 wt.% After the addition of the 30 grams of Mg granules, the sulphur content had fallen to 0.005 wt.%. This is about 94% of the theoretical maximum yield for magnesium.

EXAMPLE 11

To a pig iron melt of 180 kg, 40 grams of Mg granules were added. At the start of the experiment, the sulphur content was 0.042 wt.%. The value after injection was 0.017 wt.%. This is about 94% of the theoretical maximum yield for magnesium.

EXAMPLE 12

To a pig iron melt of 200 kg, 40 grams of Mg granules were added. At the beginning of the experiment, the sulphur content was 0.013 wt.%. After injection, the sulfur content was 0.006 wt.%. This is about 40% of the theoretical maximum yield of magnesium.

The method is not limited to the addition of magnesium. Also other refining additives can be used, such as sodium, sodium carbonate or lime.

I claim:

1. A method of treating a liquid which is caused to rotate inside a hollow cylindrical body having a smooth outer vertical surface thereof with at least one inlet hole at the bottom of the hollow cylindrical body and a plurality of outlet holes in said outer vertical surface spaced from the bottom of the hollow body, the cylindrical hollow body being attached to a vertical hollow shaft in fluid communication with the hollow cylindrical body and the hollow cylindrical body being at least partly submerged in a liquid with the outlet holes below the level of liquid, comprising:

rotating said hollow cylindrical body in the liquid with said outlet holes in said smooth outer vertical surface below the upper surface of said liquid to cause liquid to pass through said at least one inlet hole and rotate inside said hollow cylindrical body forming a parabolic liquid surface within said hollow cylindrical body, the lowermost level of said parabolic liquid surface being below said outlet holes and the uppermost level of said parabolic liquid being above said outlet holes; and passing gas into said hollow cylindrical body for intermixing with said liquid below said parabolic liquid surface, which together are ejected out said outlet holes into the surrounding liquid, whereby the liquid is treated with gas solely by rotation of said cylindrical hollow body having a smooth outer vertical surface.

2. The method of claim 1, wherein said gas is one or more gases selected from the group consisting of argon, nitrogen, chlorine, oxygen and freon 12.

3. The method of claim 1, wherein said gas is oxygen.

4. The method of claim 1, wherein said liquid is treated under a vacuum.

5. The method of claim 1, wherein said gas is first passed into said hollow shaft, which is in fluid communication with said hollow cylindrical body, and then into said hollow cylindrical body for mixing with said liquid.

6. The method of claim 1, wherein said liquid is molten metal.

7. The method of claim 1, wherein said liquid is molten aluminum.

8. The method of claim 7, wherein said hollow cylindrical body is rotated with argon being passed thereto for refining said aluminum, whereby said aluminum having a hydrogen content of at least 0.29 ppm prior to treatment has a reduced hydrogen content of 0.09 ppm after treatment of the molten aluminum.

9. The method of claim 1, wherein said liquid is a molten aluminum alloy.

10. The method of claim 1, wherein said liquid is water.

11. The method of claim 1, wherein said liquid is an aqueous suspension.

12. The method of claim 1, wherein said liquid is sewage.

13. The method of claim 1, wherein a solid material is added to said hollow cylindrical body for treatment of said liquid.

14. The method of claim 13, wherein said solid is selected from the group consisting of metallic magnesium, sodium, sodium carbonate and lime.

15. The method of claim 14, wherein said liquid is molten iron.

16. The method of claim 14, wherein said liquid is a molten iron alloy.

17. The method of claim 1, wherein a liquid is added to said hollow cylindrical body for treatment of said liquid.

18. The method of claim 1, wherein said liquid is molten pig iron, said gas is argon and magnesium granules are added to said hollow cylindrical body to desulfurize said molten pig iron, said molten pig iron having a sulfur content of at least 0.013 wt.% before treatment and a reduced sulfur content of no more than 0.006 wt.% after treatment.

* * * * *